US009007624B2

(12) United States Patent
Inoue

(10) Patent No.: US 9,007,624 B2
(45) Date of Patent: Apr. 14, 2015

(54) IMAGE PROCESSING SYSTEM FOR FACSIMILE DATA TRANSMISSION, PROCESSING METHOD THEREFOR AND STORAGE MEDIUM OF THE SAME

(75) Inventor: Katsuhiro Inoue, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 13/210,186

(22) Filed: Aug. 15, 2011

(65) Prior Publication Data
US 2012/0044533 A1 Feb. 23, 2012

(30) Foreign Application Priority Data
Aug. 18, 2010 (JP) ................................. 2010-183190

(51) Int. Cl.
G06F 3/12 (2006.01)
H04N 1/32 (2006.01)
H04N 1/00 (2006.01)

(52) U.S. Cl.
CPC ............ *H04N 1/324* (2013.01); *H04N 1/0022* (2013.01); *H04N 1/32411* (2013.01); *H04N 1/32614* (2013.01); *H04N 1/32641* (2013.01); *H04N 1/32667* (2013.01); *H04N 1/32678* (2013.01); *H04N 2201/0093* (2013.01)

(58) Field of Classification Search
CPC . H04N 1/0022; H04N 1/324; H04N 1/32641; H04N 1/32667; H04N 2201/0093
USPC ................ 358/400, 408, 1.13–1.15
See application file for complete search history.

(56) References Cited

U.S. PATENT DOCUMENTS

| 5,838,459 | A | * | 11/1998 | Hashimoto | 358/402 |
| 5,973,791 | A | * | 10/1999 | Yamamuro et al. | 358/403 |
| 6,208,638 | B1 | * | 3/2001 | Rieley et al. | 370/354 |
| 6,600,930 | B1 | * | 7/2003 | Sakurai et al. | 455/414.3 |
| 7,184,169 | B2 | * | 2/2007 | Kropf et al. | 358/1.18 |
| 7,826,102 | B2 | * | 11/2010 | Nakamura | 358/407 |
| 7,855,795 | B2 | * | 12/2010 | Ueda et al. | 358/1.14 |
| 7,924,454 | B2 | * | 4/2011 | Boire-Lavigne et al. | 358/1.15 |
| 2002/0118397 | A1 | * | 8/2002 | Maruyama | 358/405 |

(Continued)

FOREIGN PATENT DOCUMENTS

| JP | H05-252202 A | 9/1993 |
| JP | H11-317832 A | 11/1999 |

(Continued)

*Primary Examiner* — Benny Q Tieu
*Assistant Examiner* — Quyen V Ngo
(74) *Attorney, Agent, or Firm* — Canon USA, Inc. IP Division

(57) ABSTRACT

An image processing apparatus requests a server apparatus selected from a first server apparatus and a second server apparatus to transmit image data, and after the request for the facsimile transmission, determines whether the requested facsimile transmission is completed. If the image processing apparatus determines that the requested facsimile transmission is not completed, it requests a server apparatus different from the selected server apparatus to execute the facsimile transmission. When the facsimile transmission becomes unavailable after receiving the request for the facsimile transmission, the server apparatus determines whether the requested facsimile transmission is completed by another server apparatus in response to a recovery from the unavailable status. If the server apparatus determines that the requested facsimile transmission is completed by another server apparatus, it cancels the requested facsimile transmission.

9 Claims, 8 Drawing Sheets

(56) References Cited

U.S. PATENT DOCUMENTS

| | | | |
|---|---|---|---|
| 2004/0190060 A1* | 9/2004 | Funakawa et al. | 358/1.16 |
| 2006/0227367 A1* | 10/2006 | Kitada | 358/1.15 |
| 2007/0247669 A1* | 10/2007 | Iwai et al. | 358/400 |
| 2008/0007790 A1* | 1/2008 | Fujita | 358/400 |
| 2008/0281624 A1* | 11/2008 | Shibata | 705/1 |
| 2009/0122342 A1* | 5/2009 | Kawano | 358/1.15 |
| 2009/0244609 A1* | 10/2009 | Inoue et al. | 358/1.15 |
| 2010/0110471 A1* | 5/2010 | Inoue | 358/1.14 |

FOREIGN PATENT DOCUMENTS

| | | |
|---|---|---|
| JP | 2005-136459 A | 5/2005 |
| JP | 2009-015360 A | 1/2009 |
| JP | 2010-003175 A | 1/2010 |
| JP | 2010-034766 A | 2/2010 |

* cited by examiner

IMAGE PROCESSING SYSTEM FOR FACSIMILE DATA TRANSMISSION, PROCESSING METHOD THEREFOR AND STORAGE MEDIUM OF THE SAME

BACKGROUND OF THE INVENTION

1. Field of the Invention

The present invention relates to an image processing system including first and second server apparatuses for transmitting image data by facsimile and an image processing apparatus which requests the server apparatuses to transmit the image data by facsimile.

2. Description of the Related Art

Japanese Patent Laid-Open No. 2010-034766 discusses this kind of system based on the related art. This system is configured to be able to provide a service relating to facsimile data transmission to a plurality of image processing apparatuses connected to the same LAN as a facsimile server (hereinafter referred to as fax server).

The image processing apparatus operates as a client for the fax server and dispatches a variety of requests such as a facsimile transmission request and an image data transmission request to the fax server. FIG. 8 is a configuration diagram of a fax client server system belonging to the related art.

FIG. 8 shows a LAN 110 which includes image processing apparatuses, a fax server, and the like. A facsimile apparatus 104, a fax server 103, and the like are connected to a public line 120. Image processing apparatuses 101, 102 are connected to the LAN 110 and the fax server 103 is connected to both the LAN 110 and the public line 120.

The conventional fax server is configured as described above. Thus, in a system in which a fax server is connected to an identical LAN, if a failure which cannot be recovered occurs in the fax server, the fax server becomes unusable, thereby disabling transmission by facsimile.

SUMMARY OF THE INVENTION

The present invention is directed to providing a system which can execute transmission by facsimile without any problem even if a server apparatus fails.

According to an aspect of the present invention, an image processing system includes a first server apparatus and a second server apparatus each configured to transmit image data by facsimile and an image processing apparatuses configured to request a server apparatus to transmit the image data by facsimile. The image processing system includes a request unit configured to request a selected server apparatus from the first server apparatus and the second server apparatus to transmit the image data by facsimile and a determining unit configured to, after the request unit requests a facsimile transmission, determine whether a requested facsimile transmission is completed according to a response from the selected server apparatus. When the determining unit determines that the requested facsimile transmission is not completed, the request unit requests a server apparatus different from the selected server apparatus to execute the facsimile transmission. Each of the first server apparatus and the second server apparatus comprise a transmission unit configured to execute the facsimile transmission according to a request for the facsimile transmission, a determining unit configured to, when the facsimile transmission becomes unavailable after receiving a request for the facsimile transmission, determine whether the requested facsimile transmission is completed by another server apparatus in response to a recovery from the facsimile transmission being unavailable, and a cancel unit configured to, when the determining unit determines that the requested facsimile transmission is completed by another server apparatus, cancel the requested facsimile transmission.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Hereinafter, an example of an image processing apparatus capable of transmitting a plurality of read image data to first and second server apparatuses (primary server and secondary server acting as fax servers described below) will be described, the first and second server apparatuses executing facsimile transmission/reception processing by public line(s).

Figure 1:
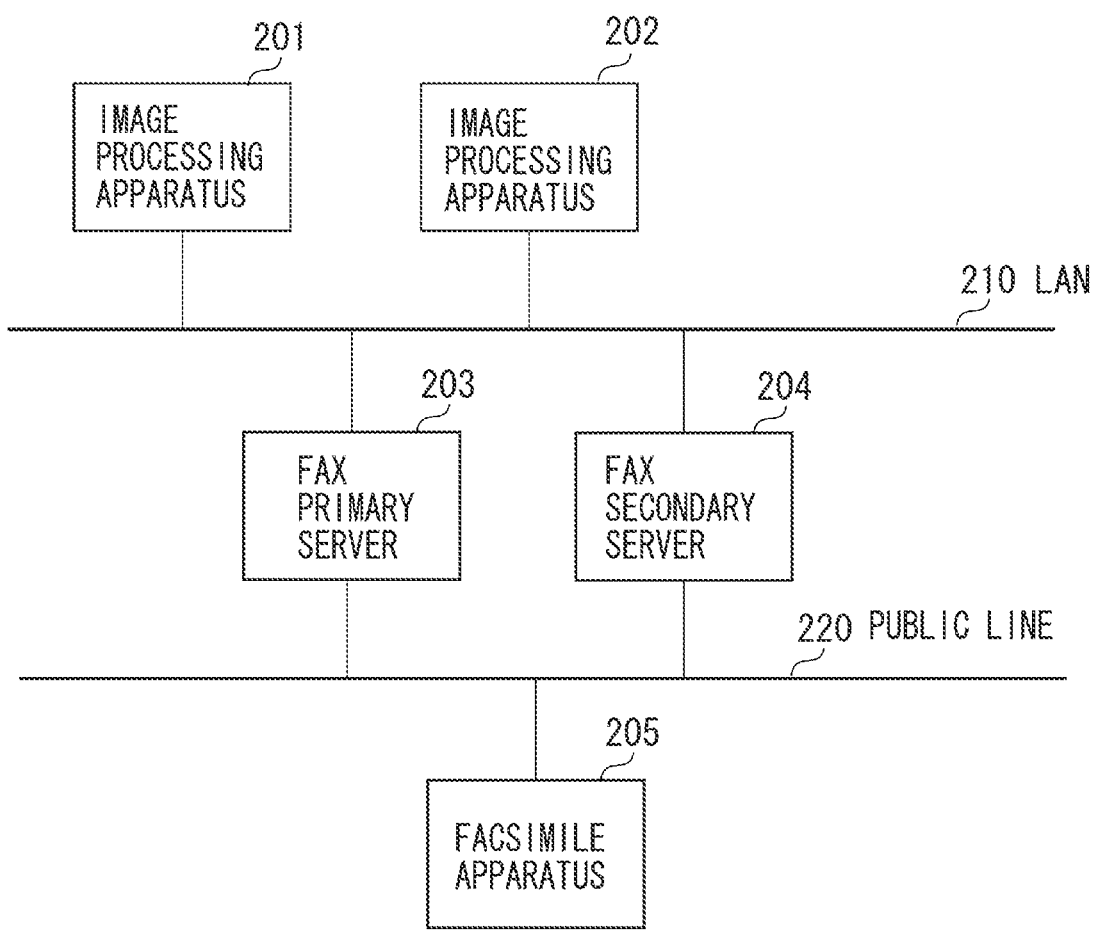
FIG. 1 is a block diagram illustrating the configuration of an image processing system.

FIG. 1 is a block diagram illustrating the configuration of an image processing system according to a first exemplary embodiment of the present invention. This exemplary embodiment concerns a server client system having a plurality of fax servers each having a function for transmitting and receiving fax data to/from multiple image processing apparatuses which serve as clients, connected to an identical LAN. The present embodiment is an example in which the fax server includes a primary server and a secondary server. In this exemplary embodiment, the fax primary server and the fax secondary server are image processing apparatuses having a reading unit for reading an image on a document. However, any type of apparatus that would enable practice of the present invention can be used as the fax primary and second servers.

Referring to FIG. 1, the image processing apparatus of this embodiment includes LAN 210, public line 220, image processing apparatuses 203, 204, which act as clients connected to the LAN 210 (hereinafter referred to as client), fax primary and secondary servers 201, 202 connected to the LAN 210 and the public line 220 and a facsimile apparatus 205 connected to the public line 220.

Figure 2:
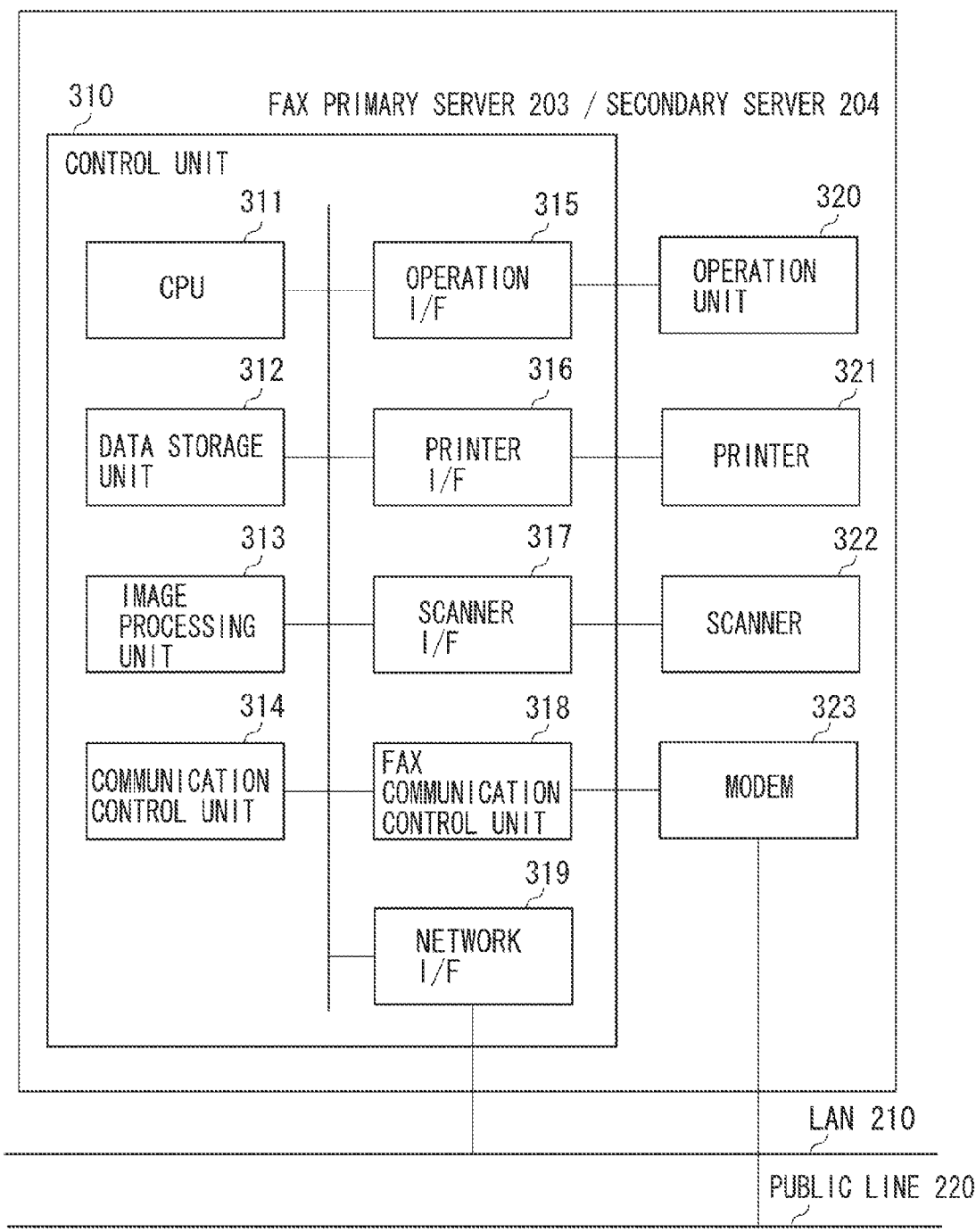
FIG. 2 is a block diagram illustrating the configuration of the fax servers shown in FIG. 1.

FIG. 2 is a block diagram illustrating the configuration of fax primary server 203 and fax secondary server 204 shown in FIG. 1. The fax servers 203, 204 include a control unit 310, an operation unit 320, a printer 321, a scanner 322 and a modem 323.

The control unit 310 includes a CPU 311, a data storage unit 312 for storing image data and code data, and an image processing unit 313 which carries out enlargement/reduction conversion depending on a resolution of the printer and encoding corresponding to a fax coding system. The control unit 310 further includes a communication control unit 314 for controlling a communication result, an operation I/F 315, a printer I/F 316, and a scanner I/F 317. Additionally, the control unit 310 includes a fax communication control unit 318 for controlling communication with a facsimile apparatus 205 connected to the public line 220, and a network I/F 319 for controlling communication via a LAN 210.

Figure 3:
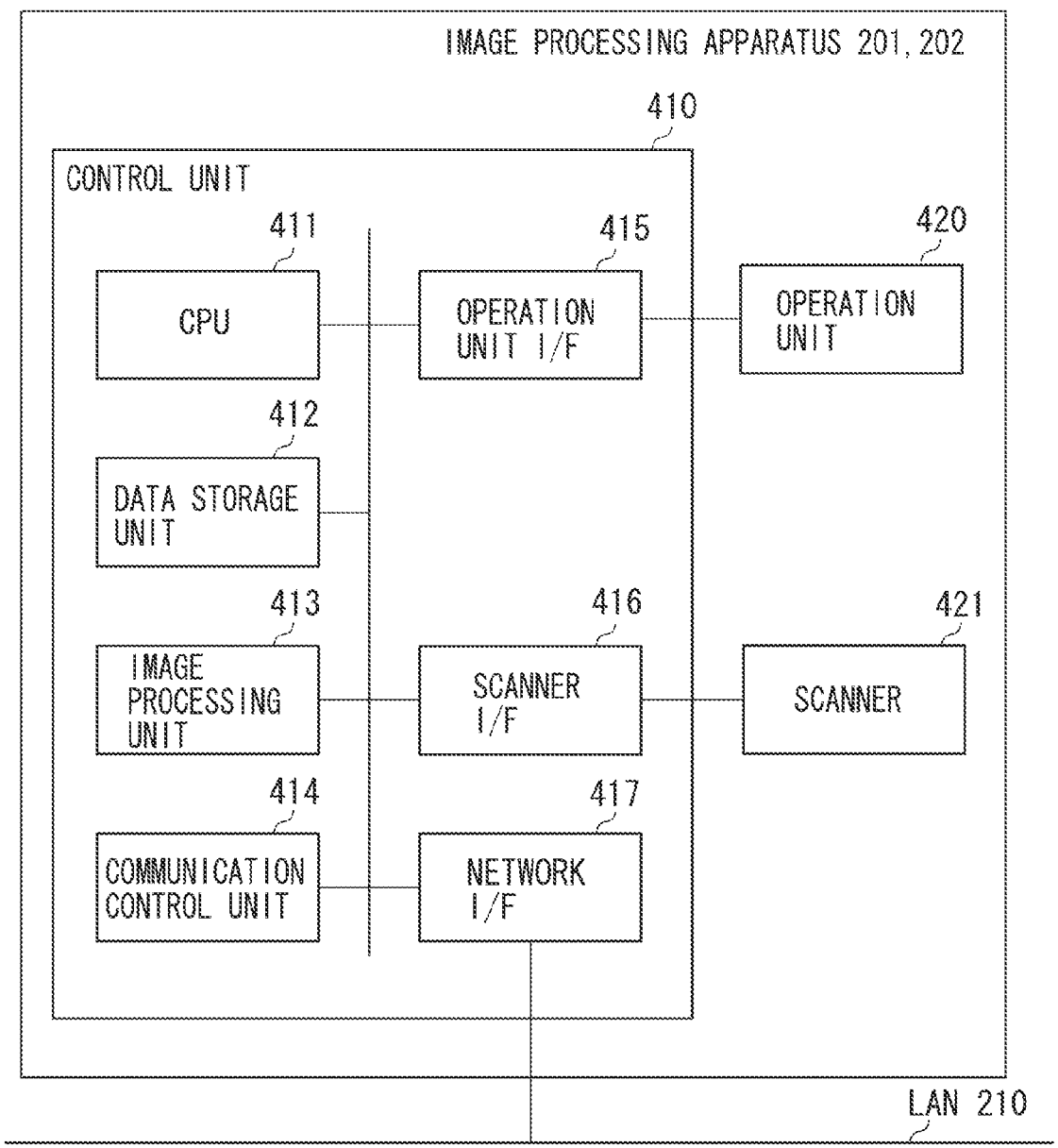
FIG. 3 is a block diagram illustrating the configuration of the image processing apparatuses shown in FIG. 1.

FIG. 3 is a block diagram illustrating the configuration of the image processing apparatuses shown in FIG. 1. Referring to FIG. 3, each of the image processing apparatuses 201, 202 includes at least a control unit 410, an operation unit 420 and a scanner 421.

The control unit 410 includes a CPU 411, a data storage unit 412 for storing image data and code data, and an image processing unit 413 which carries out enlargement/reduction conversion depending on a resolution of the printer. The control unit 410 further includes a communication control unit 414 for controlling a communication result, an operation unit I/F 415, a scanner I/F 416 and a network I/F 417 for controlling communication via the LAN 210.

Here, an example in which a document scanned by the image processing apparatus 201 is transmitted to the fax primary server 203 as a fax transmission job and the fax primary server 203 transmits the document to the facsimile apparatus 205 via the public line 220 will be described briefly.

An image data is produced by scanning the document with the scanner 421 and formed into a predetermined format by the image processing unit 413. After that, the image data is transmitted to the fax primary server 203 with a fax transmission request via the network I/F 417.

The fax primary server 203 receives image data via the network I/F 319, stores the image data in the data storage unit 312, and the image processing unit 313 encodes the image data according to the coding system of the facsimile apparatus 205.

Next, the fax communication control unit 318 connects fax primary server 203 to the facsimile apparatus 205 via the public line 220 to transmit the encoded data. After the transmission to the facsimile apparatus 205 is completed, a communication result indicating the end of the communication is transmitted to the image processing apparatus 201 via the network I/F 319.

The above-described example refers to a case of transmitting a document from the image processing apparatus 201 to the facsimile apparatus 205. According to the system of the present embodiment, a document received by the facsimile apparatus 205 can be stored in the fax primary server 203, transferred to the image processing apparatuses 201, 202, displayed thereon, and printed out.

Figure 4:
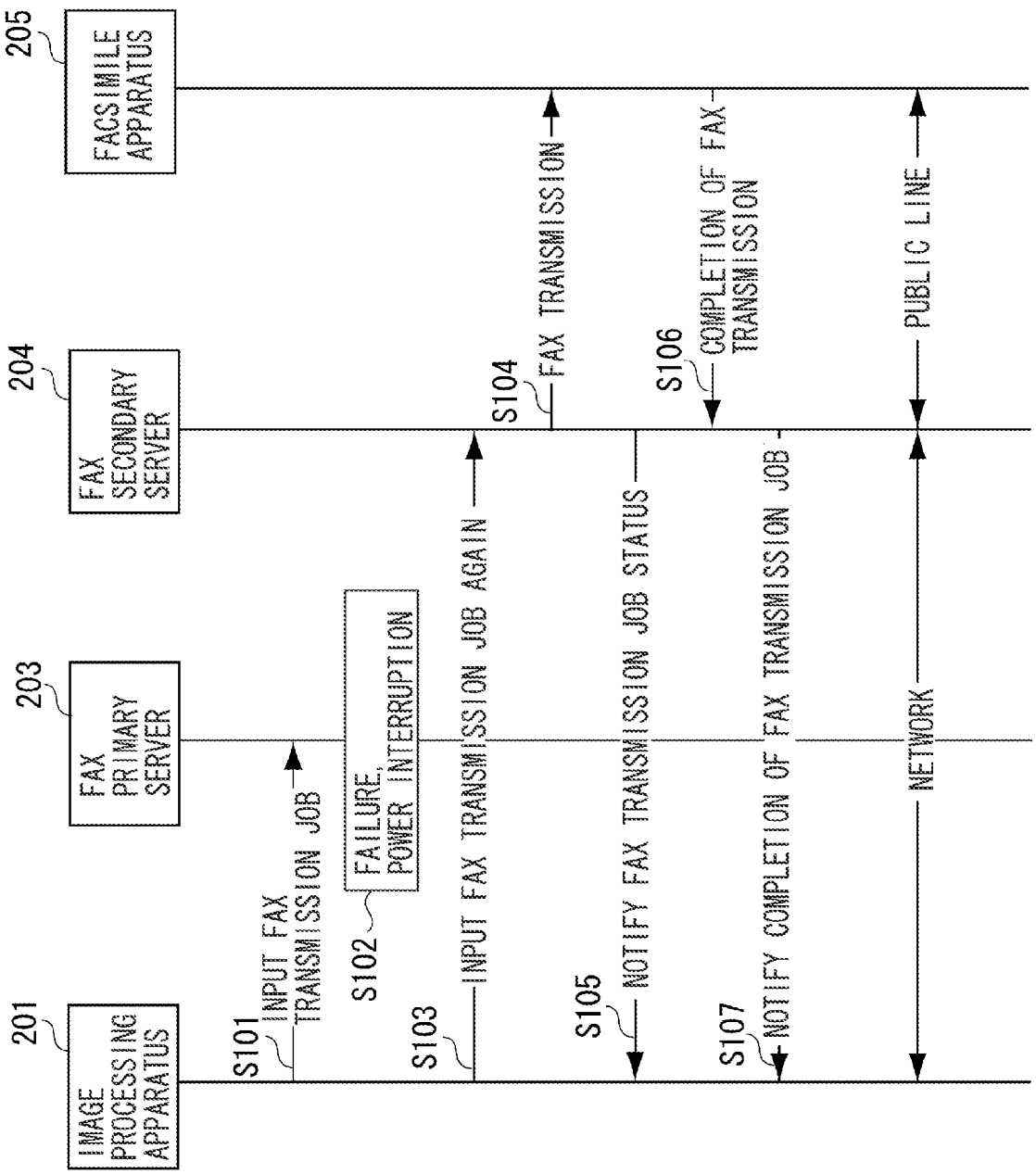
FIG. 4 is a diagram illustrating an example of a communication sequence of the image processing system.

FIG. 4 is a diagram illustrating an example of a communication sequence of the image processing system according to the present embodiment. In the system shown in FIG. 4, it is assumed that after a fax transmission request is sent from a client to the fax primary server 203, a failure occurs in the data storage unit 412 of the fax primary server 203. More specifically, assuming that the client cannot receive a communication status of a fax transmission job from the fax primary server 203 due to such a failure, a procedure which the fax secondary server 204 takes over the fax transmission processing of the fax primary server 203 will be described with reference to a flow chart shown in FIG. 5.

Figure 5:
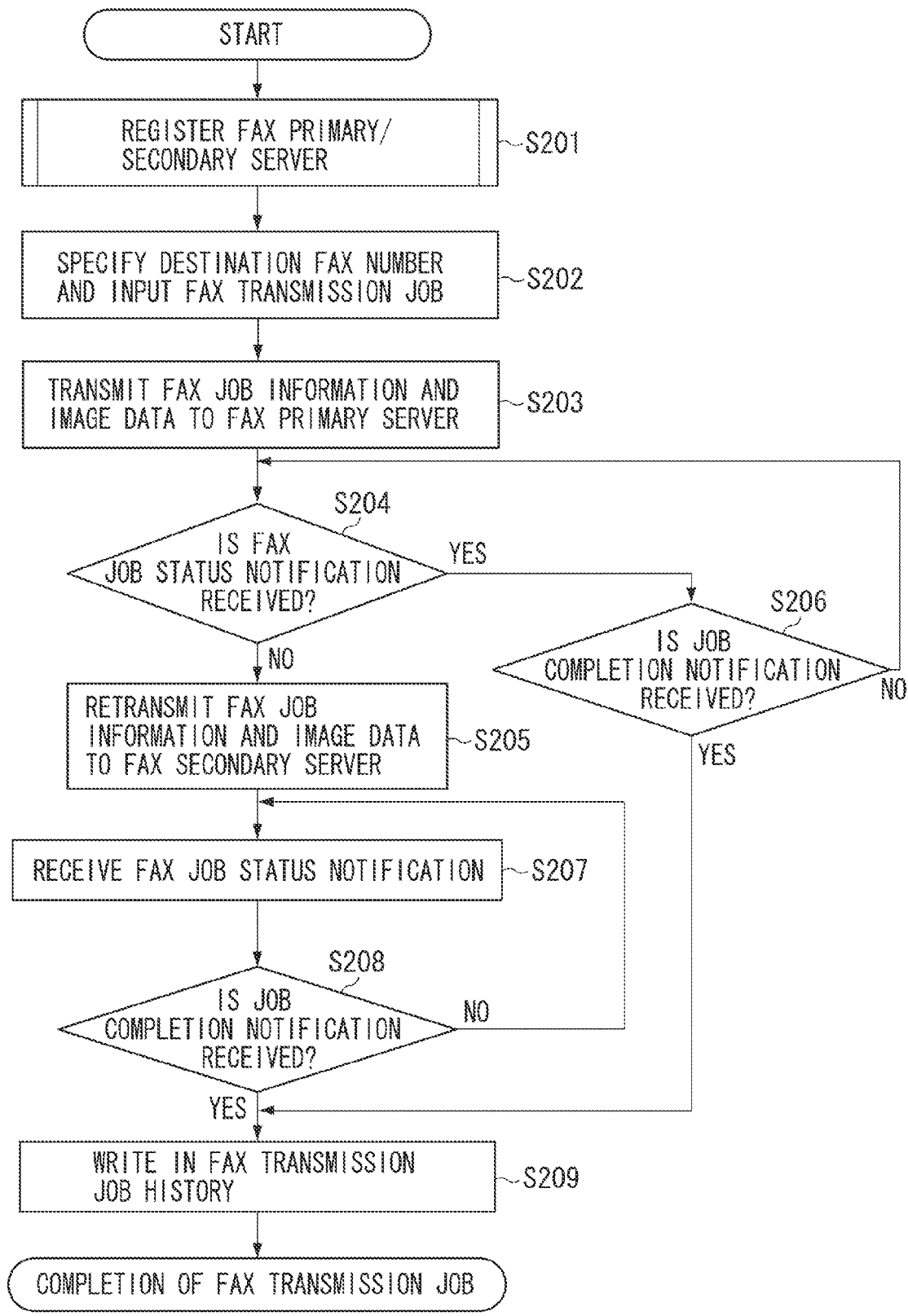
FIG. 5 is a flow chart illustrating a control procedure of the image processing apparatus.

FIG. 5 is a flow chart illustrating a control procedure of the image processing system of the present embodiment. This embodiment concerns an example of data transmission processing by the image processing apparatus 201. S201-S209 indicate respective steps and each step is achieved by the CPU 411 which loads a control program on a RAM from a ROM or the like and executes it.

In S201, the operation unit 420 accepts an IP address which is registered by preliminarily selecting an IP address registration button of the fax primary/secondary servers. This processing may be executed at a time independent of a series of processing described below. This processing is the one for setting an order of precedence to the first server apparatus (fax primary server 203) and the second server apparatus (fax secondary server 204). Then, the operation unit 420 transmits a notification about the acceptance of the IP addresses to the CPU 411 of the control unit 410. The CPU 411 stores the accepted fax primary/secondary servers' IP addresses in the data storage unit 412.

Next, in S202, the operation unit 420 of the image processing unit 201 accepts a destination telephone number input by user and a selection of the fax transmission button and then transmits a notification of the acceptance to the CPU 311 of the control unit 310 of the fax primary server 203 according to the preliminarily registered IP address.

Next, the CPU 411 of the control unit 410 instructs the scanner 421 to scan a document. Then, the scanner 421 of the image processing apparatus 201 scans the document and the CPU 411 temporarily stores the image data obtained by the scanning in the data storage unit 412.

Next, in S203, the CPU 411 of the control unit 410 transmits image data stored in the data storage unit 412 and the fax job information to an IP address of the fax primary server 203, which is stored in s201 via the network I/F 417 (corresponding to S101 in FIG. 4). This processing is request processing which the image processing apparatus 201 acting as a client executes to request the fax primary server 203 or the fax secondary server 204 selected according to the order of precedence to execute a fax transmission job via the network 210.

Next, in S204, the CPU 411 determines whether the image processing apparatus 201 has received a notification about the fax job from the fax primary server 203 within a specified interval of time. More specifically, after the request processing of S203, the CPU 411 determines whether the fax reception has been completed according to a response from the fax primary server 203.

If the CPU 411 determines that the image processing apparatus 201 has not received notification about the fax job status, the process proceeds to S205. Such a case arises, for example, when the fax primary server 203 cannot communicate due to some reason or when power supply is interrupted (corresponding to S102 in FIG. 4). If the CPU 411 determines that the notification has been received, flow proceeds to S206. Then, in S206, the CPU 411 determines whether the communication control unit 414 has received a notification about completion of the fax job from the fax primary server 203. If the CPU 411 determines that the communication control unit 414 has received the notification about the completion of the fax job from the fax primary server 203, the process proceeds to S209. If the CPU 411 determines that the communication control unit 414 has not received the notification, then flow returns to S204.

Next, in S205, the CPU 411 transmits the fax job to the IP address of the secondary server registered in S101 of FIG. 4, similar to the processing in S203. More specifically, the CPU 411 retransmits the fax job which has not been completed properly in order to request the fax secondary server 204 to transmit the fax job (corresponding to S103 in FIG. 4) again.

Figure 6:
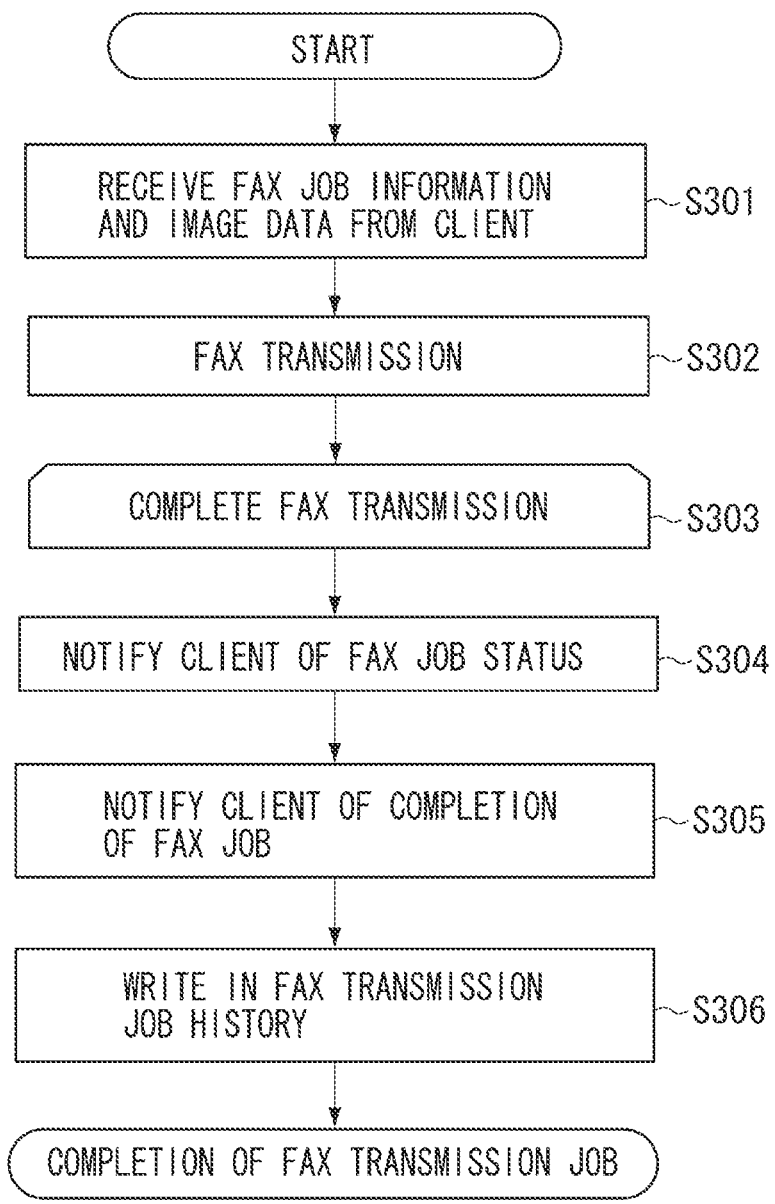
FIG. 6 is a flow chart illustrating a control procedure of the image processing apparatus.

FIG. 6 is a flow chart illustrating a control procedure of the image processing system of present embodiment. This example shows data transmission processing by the fax secondary server 204. S301-S306 indicate respective steps and each step is achieved by the CPU 311 which loads a control program on the RAM from the ROM or the like and then executes it.

In S301, the CPU 311 of the fax secondary server 204 receives fax job information and image data from the image processing apparatus 201 via the network 210. Then, in S302, the fax secondary server 204 executes the fax transmission to the facsimile apparatus 205 via the public line 210 (corresponding to S104 in FIG. 4). In S303, the CPU 311 of the fax secondary server 204 notifies the image processing apparatus 201 of a fax transmission status until the fax transmission is completed (S304) (corresponding to S105 in FIG. 4).

Next, when the CPU 311 of the fax secondary server 204 detects that the fax transmission has been completed (corresponding to S106 in FIG. 4), in S305, the CPU 311 of the fax secondary server 204 notifies the image processing apparatus 201 of a completion of the transmission job (corresponding to S107 in FIG. 4). In S306, the communication control unit 314 of the fax secondary server 204 writes information relating to fax transmission history (including information for specifying a transmission destination, presence/absence of transmission error, and communication time) into the data storage unit 312 and then completes the processing.

Returning to FIG. 5, in S207, the communication control unit 414 of the image processing apparatus 201 receives a notification about job status of the fax job from the fax secondary server 204. Then, in S208, the CPU 411 determines whether the communication control unit 414 has received a notification about completion of the fax job from the fax secondary server 204. If the CPU 411 determines that the communication control unit 414 has received the notification about the completion of the fax job from the fax secondary server 204, the process proceeds to S209. If the CPU 411 determines that the communication control unit 414 has not received the notification, then flow returns to S207. In S209, the communication control unit 414 writes information indicating the job history into the data storage unit 412 according to an instruction from the CPU 411 and completes the processing for the fax transmission job.

As described above, even if a failure occurs in processing function of any one of a plurality of fax servers connected to both the LAN 210 and public line 220, the other fax server can recover the transmission job. More specifically, even if due to a failure generated in one fax server, the fax transmission job from an image processing apparatus is interrupted halfway or a failure of the fax transmission occurs, the other fax server can take over the processing so as to execute a smooth fax transmission.

Hereinafter, a treatment for power interruption or any failure in fax transmission processing function, which occurs due to some reason after the fax primary server 203 receives fax transmission job information and image data from the image processing apparatus 201, 202 under the above-described embodiment, will be described. More specifically, if a failure occurs in the fax primary server 203, there are two cases when the fax primary server 203 is restored to a status enabling communication, i.e., completion of processing of a job received prior to the recovery and restarting processing of the job.

Figure 7:
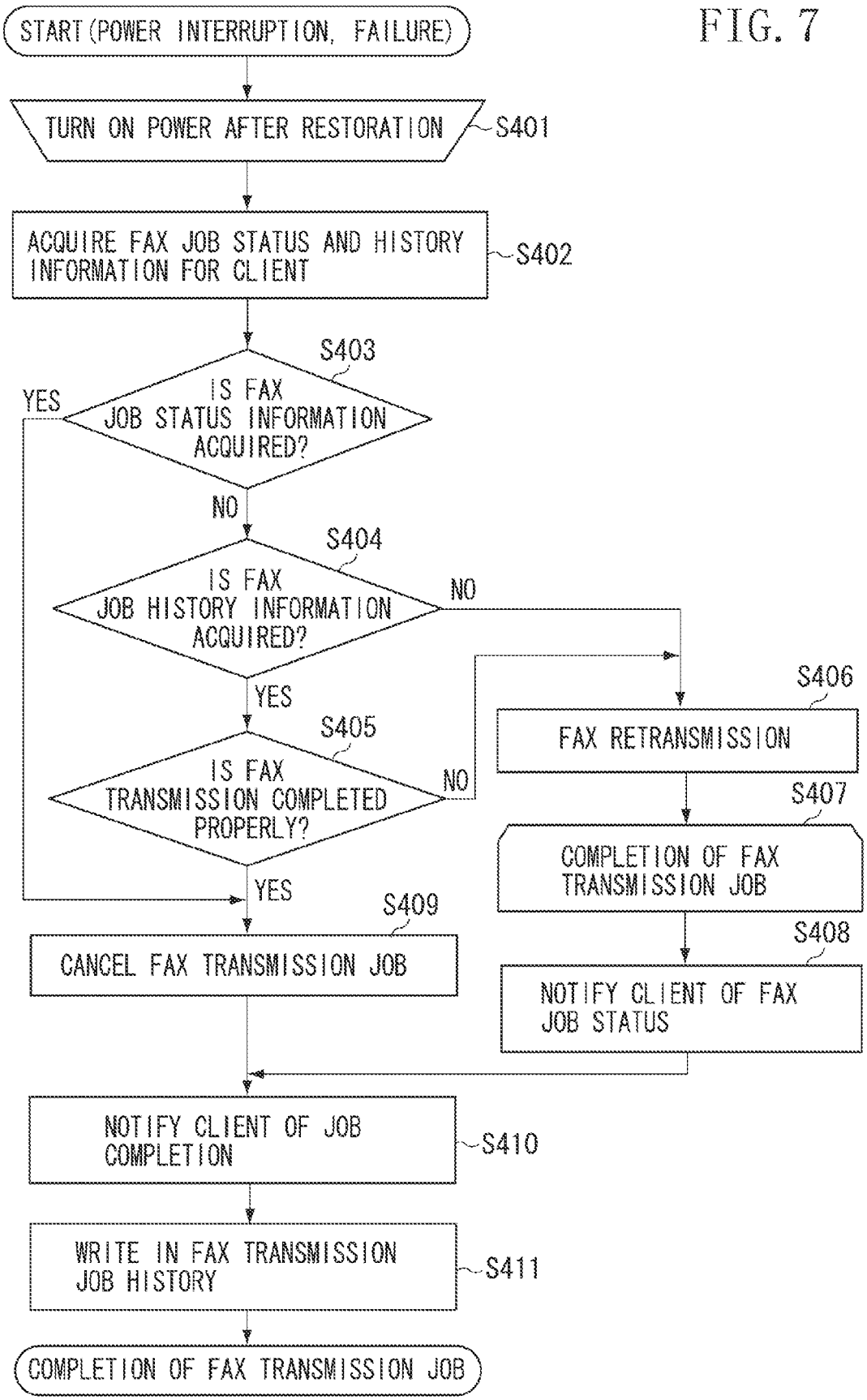
FIG. 7 is a flow chart illustrating a control procedure of the image processing apparatus.
Figure 8:
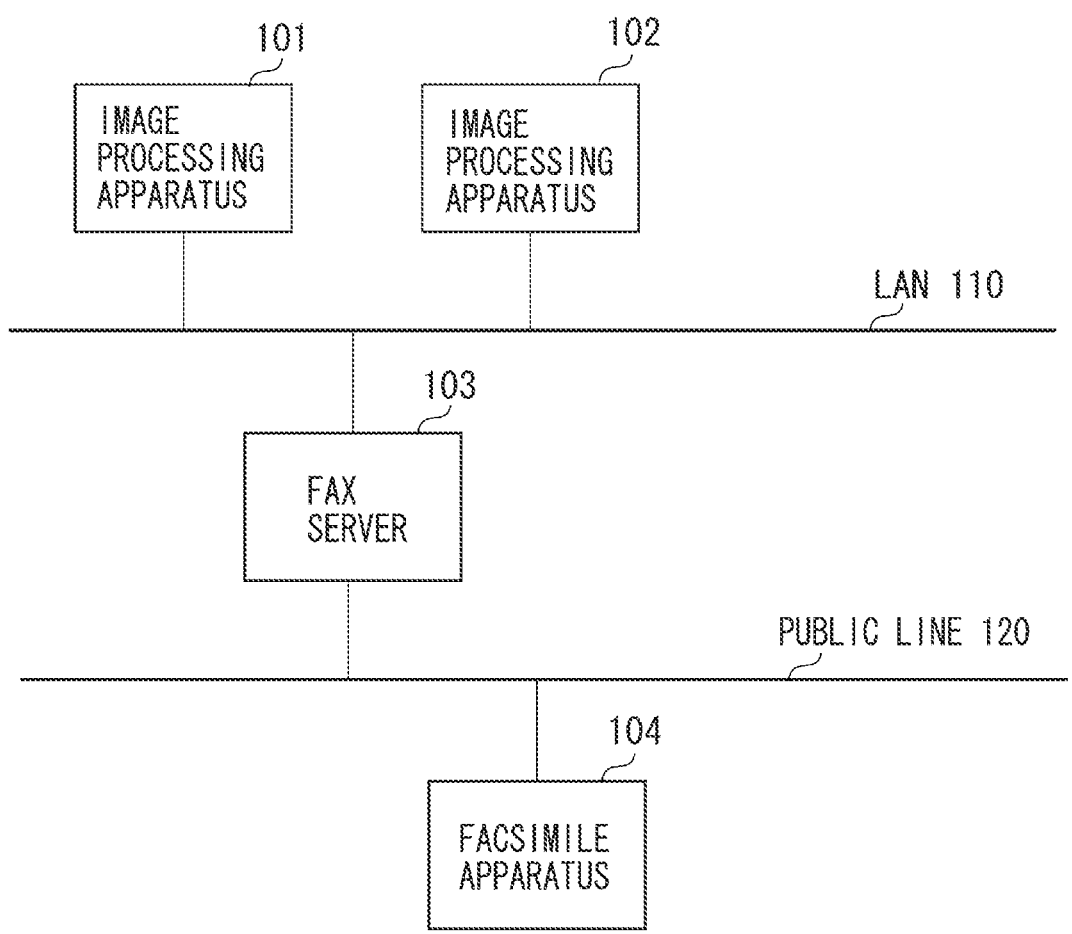
FIG. 8 is a configuration diagram illustrating a fax client server system of related art.

FIG. 7 is a flow chart illustrating a control procedure of the image processing system of a second embodiment of the present invention. This embodiment indicates an example of data transmission processing by the fax primary server 203. S401-S411 indicate respective steps and each step is achieved by the CPU 311 which loads a control program on the RAM from the ROM or the like and executes it.

In S401, after the processing of S107 is completed, when a user presses a power switch (not shown), the fax primary server 203 is powered on. Then, in S402, when the fax primary server 203 is started, the CPU 311 of the control unit 310 acquires job status information and job history information from the image processing apparatus 201 if the job information and image data exist in the data storage unit 312. In addition, the image processing apparatus 201 executes a response processing (not illustrated) that responds to an inquiry about a job processing status from the fax primary server 203.

Then, in S403, the CPU 311 determines whether the data storage unit 312 has acquired the job status information. In a case where the CPU 311 determines that the data storage unit 312 has acquired the job status information, the process proceeds to S409.

If the CPU 311 determines that the data storage unit 312 cannot acquire the job status information in S403, the process proceeds to S404. In S404, the CPU 311 determines whether the job history information has been acquired from the image processing apparatus 201. If the CPU 311 determines that the job history information has been acquired from the image processing apparatus 201, the CPU 311, in S405, refers to the acquired job history information to determine whether a transmission job received from the image processing apparatus 201 before a failure occurs is completed properly. If the CPU 311 determines that the transmission job has been completed properly, then in S409, the CPU 311 deletes the transmission job stored in the data storage unit 312 to cancel the job.

Next, in S410, the CPU 311 notifies the image processing apparatus 201 which has received the transmission job, of a completion of the job via the network 210. After the processing of the transmission job is completed, in S411, the communication control unit 314 writes the fax transmission job history into the data storage unit 312 according to an instruction of the CPU 311, to complete the processing.

If the CPU 311 determines in S404 that the fax job history information was not acquired or in S405 that the fax transmission did not properly complete, the process proceeds to S406. In S406, the CPU 311 retransmits the transmission job stored in the data storage unit 312 via the public line 220 using the fax communication control unit 318 and the modem 323. Next, in S407, the CPU 311 completes the processing of the transmission job received from the image processing apparatus 201. In S408, the CPU 311 notifies the image processing apparatus 201 of a fax job status via the network 210 and the process proceeds to S410.

As described above, double transmission of the same fax job by retransmitting the fax job can be prevented even if a fax job still remains after the fax secondary server 204 takes over the processing of the fax primary server 203 and then the fax primary server 203 is restored.

The above-described embodiment has discussed a case of determining the processing status of a transmitted job prior to restoration from a failure by acquiring a fax status from an image processing apparatus after a fax primary server is restored. However, the present invention may be configured such that the processing status of the transmitted job is determined by a fax primary server communicating with a fax secondary server. In this case, by assuming that the fax secondary server has completed the transmission job, only processing of deleting the transmission job which is received from the image processing apparatus and stored in the fax primary server need be performed.

According to the above-described embodiments, if a failure occurs in the processing function of a fax server connected to both a LAN and a public line, another fax server can take over that processing to effectively utilize the fax transmission system resources using a plurality of fax servers to smoothly carry out a fax transmission.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-183190 filed Aug. 18, 2010, which is hereby incorporated by reference herein in its entirety.

What is claimed is:

1. A facsimile server capable of communicating with an image processing apparatus, the facsimile server comprising:
a receiving unit configured to receive a transmission job from the image processing apparatus;
an obtaining unit configured to obtain job history information stored in the image processing apparatus;
a determining unit configured to determine, based on the job history information obtained by the obtaining unit, after the receiving unit received transmission job, whether or not the received transmission job is completed;
a transmission unit configured to execute the received transmission job in a case where it is determined that the received transmission job is not completed; and
a cancelling unit configured to cancel the received transmission job in a case where it is determined that the received transmission job is completed.

2. The facsimile server according to claim 1, wherein the obtaining unit is configured to obtain the job history information when the facsimile server is recovered from a failure.

3. The facsimile server according to claim 1, wherein the obtaining unit is configured to obtain the job history information when the facsimile server is powered on.

4. The facsimile server according to claim 1, wherein the case where it is determined that the received transmission job is completed is a case where the received transmission job is executed by another facsimile server.

5. A facsimile system including an image processing apparatus and a plurality of facsimile servers which are capable of communicating with the image processing apparatus, the image processing apparatus comprising:
a requesting unit configured to request execution of a transmission job to the plurality of facsimile servers; and
a management unit configured to manage job history information of the transmission job, and
one of the plurality of facsimile servers comprising:
a receiving unit configured to receive a transmission job from the image processing apparatus;
an obtaining unit configured to obtain the job history information stored in the image processing apparatus;
a determining unit configured to determine, based on the job history information obtained by the obtaining unit, after the receiving unit receives the transmission job, whether or not the received transmission job is completed;
a transmission unit configured to execute the received transmission job in a case where it is determined that the received transmission job is not completed; and
a cancelling unit configured to cancel the received transmission job in a case where it is determined that the received transmission job is completed.

6. A control method for a facsimile server which is capable of communicating with an image processing apparatus, the method comprising:
receiving a transmission job from the image processing apparatus;
obtaining job history information stored in the image processing apparatus;
determining, based on the obtained job history information, after the transmission job is received, whether or not the received transmission job is completed;
executing the received transmission job in a case where it is determined that the received transmission job is not completed; and
cancelling the received transmission job in a case where it is determined that the received transmission job is completed.

7. A method for a facsimile system including an image processing apparatus and a plurality of facsimile servers which are capable of communicating with the image processing apparatus, the method comprising,
in the image processing apparatus:
requesting execution of a transmission job to the plurality of facsimile servers; and
managing job history information of the transmission job, and
in one of the plurality of facsimile servers:
receiving a transmission job from the image processing apparatus;
obtaining the job history information stored in the image processing apparatus;
determining, based on the obtained job history information, after the transmission job is received, whether or not the received transmission job is completed;
executing the received transmission job in a case where it is determined that the received transmission job is not completed; and
cancelling the received transmission job in a case where it is determined that the received transmission job is completed.

8. A non-transitory computer-readable storage medium configured to store a program which causes a computer to execute the method according to claim 6.

9. A non-transitory computer-readable storage medium configured to store a program which causes a computer to execute the method according to claim 7.

* * * * *